United States Patent [19]

Marcott

[11] Patent Number: 5,497,692
[45] Date of Patent: Mar. 12, 1996

[54] ELECTROHYDRAULIC STEERING SYSTEM

[75] Inventor: Tony L. Marcott, Plainfield, Ill.

[73] Assignee: Caterpillar Inc., Peoria, Ill.

[21] Appl. No.: 396,808

[22] Filed: Mar. 2, 1995

[51] Int. Cl.$^6$ ........................................... F15B 11/00
[52] U.S. Cl. ................... 91/523; 91/529; 91/459; 91/461; 60/385; 180/142
[58] Field of Search ............... 91/459, 461, 453, 91/465, 521, 523, 524, 525, 528, 529, 434; 60/385, 387; 180/132, 142

[56] References Cited

U.S. PATENT DOCUMENTS

| | | | |
|---|---|---|---|
| 3,877,346 | 4/1975 | Koopmann et al. | 91/411 R |
| 3,922,953 | 12/1975 | Strauff | 91/465 X |
| 3,948,050 | 4/1976 | Kervagoret | 91/434 X |
| 4,194,361 | 3/1989 | Pahl et al. | 60/388 |
| 4,385,493 | 5/1983 | Lang | 91/465 X |
| 4,926,956 | 5/1990 | Duffy | 180/142 |
| 5,052,506 | 10/1991 | Nishimori et al. | 91/529 X |
| 5,234,070 | 8/1993 | Noah et al. | 180/142 X |
| 5,236,057 | 8/1993 | Takehara et al. | 180/142 X |
| 5,267,629 | 12/1993 | Mouri | 180/142 |

*Primary Examiner*—Edward K. Look
*Assistant Examiner*—Hoang Nguyen
*Attorney, Agent, or Firm*—John W. Grant

[57] ABSTRACT

An electrohydraulic steering system has a pair of proportional valves for controlling displacement of a steering valve for normal steering functions. The proportional valves are selectively energized by a position sensor in response to rotation of a steering wheel. However, should an electrical malfunction occur, rotation of the steering wheel beyond the normal operating range causes a steering control member to mechanically move an armature of the proportional valves through a spring to provide mechanical/hydraulic steering. Making the armatures of the proportional valves responsive to a mechanical input through the springs provides a simple, cost effective mechanical/hydraulic backup for the primary electrohydraulic steering control.

3 Claims, 1 Drawing Sheet

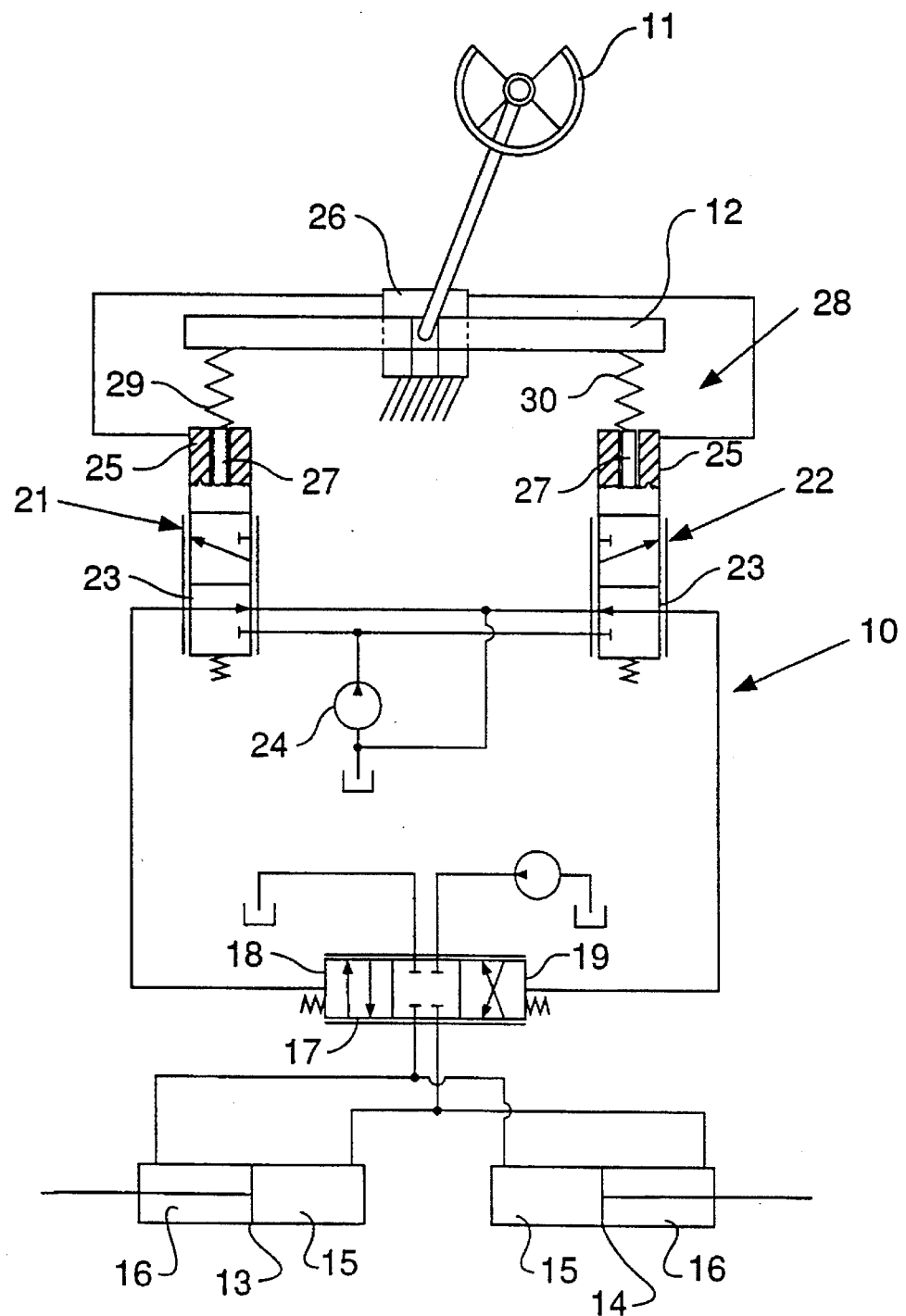

ELECTROHYDRAULIC STEERING SYSTEM

TECHNICAL FIELD

This invention relates generally to a steering system for an industrial machine and, more particularly, to an electrohydraulic steering system having an auxiliary mechanical/hydraulic steering arrangement interfaced therewith.

BACKGROUND ART

Electrohydraulic steering controls are being developed for heavy-duty industrial machines because of their potential versatility over mechanical and hydraulic steering systems. Such electrohydraulic steering systems commonly use solenoid operated pilot valves for directing pilot fluid to a primary steering valve for steering the machine in response to manual manipulation of a steering control member, i.e. a steering wheel. The solenoid pilot valves are energized in response to electrical signals outputted from a sensor when the steering control member is moved in opposite directions from a neutral position. One of the concerns from a manufacturer's viewpoint is that customers are somewhat reluctant to purchase large machines in which the steering is dependent solely upon electrohydraulic circuitry.

In view of the above, it would be desirable to have an electrohydraulic steering system for the normal steering functions while having a simple mechanical/hydraulic steering arrangement interfaced therewith for steering the machine should a malfunction occur in the electrical circuitry.

The present invention is directed to overcoming one or more of the problems as set forth above.

DISCLOSURE OF THE INVENTION

In one aspect of the present invention, an electrohydraulic steering system has a manually operated steering control member movable in opposite directions from a neutral position and a pilot operated steering valve having opposite ends. The system includes a pair of solenoid valves individually hydraulically connected to the opposite ends of the steering valve with each valve including a valving portion, an electromagnetic coil, and an armature disposed within the coil and connected to the valving portion. A position sensor is disposed to energize one of the coils upon movement of the steering control member in a first direction and to energize the other coil upon movement of the steering control member in a second direction. A means is provided for individually mechanically moving the armatures upon movement of the steering control member in either direction beyond a predetermined operating range thereof so that the solenoid valves can be selectively mechanically actuated to an operating position should an electrical malfunction occur.

BRIEF DESCRIPTION OF THE DRAWINGS

The sole FIGURE is a schematic view of an embodiment of the present invention.

BEST MODE FOR CARRYING OUT THE INVENTION

An electrohydraulic steering system 10 includes a steering wheel 11 disposed to impart pivotal movement to a steering control member 12, and a pair of hydraulic steering actuators 13,14 suitably connected to the steering mechanism of a machine. Each of the actuators has head end and rod end chambers 15,16. A pilot operated steering valve 17 has opposite ends 18,19 and is connected to the head end and rod end chambers in the usual manner. Alternatively, the steering wheel 11 can be replaced with a lever or a lever and linkage arrangement for imparting pivotal movement to the steering control member 12.

Each of a pair of solenoid actuated proportional valves 21,22 have a valving portion 23 hydraulically connected to a source of pilot pressure such as a pump 24 and individually connected to the opposite ends 18,19 of the steering valve. Each of the proportional valves also includes an electromagnetic coil 25 connected to a position sensor 26 disposed to energize one of the coils upon movement of the steering control member 12 in a first direction and to energize the other coil upon movement of the steering control member in an opposite or second direction. An armature 27 is disposed within each of the coils for moving the valving portion 23 to an operating position when the associated coil is energized.

A means 28 is provided for individually mechanically moving the armatures 27 upon movement of the steering control member 12 in either direction beyond a predetermined operating range thereof so that the proportional valves can be selectively mechanically actuated to an operating position should an electrical malfunction occur. In this embodiment, the means includes a pair of coil springs 29,30 disposed between the opposite ends of the steering control member and the armatures 27.

INDUSTRIAL APPLICABILITY

In use, steering in a first direction is initiated by rotating the steering wheel 11 clockwise. The sensor 26 detects the angular position of the steering wheel and directs an electrical signal to energize the coil 25 of the proportional valve 22 with the strength of the electrical signal being representative of the detected angular position. The electrical signal energizes the coil 25 of the proportional valve 22 causing the armature 27 to move the valving portion 23 downwardly to direct pressurized pilot fluid to the end 19 of the steering valve 17 with the fluid pressure being proportional to the strength of the electrical signal directed to the coil 25. The pressurized pilot fluid moves the steering valve to the left an appropriate amount to direct main system fluid into the rod end chamber 16 of the actuator 13 and the head end chamber 17 of the steering actuator 15.

Rotating the steering wheel counterclockwise results in the proportional valve 21 being energized to direct pilot fluid to the end 18 of the steering valve 17 resulting in main system pressure being directed to the head end chamber 15 of the actuator 13 and the rod end chamber 16 of the actuator 14.

Rotating the steering wheel 11 clockwise, for example, also pivots the steering control member 12 clockwise. In this embodiment, the spring 30 is selected so that it has substantially no effect on the armature 27 of the proportional valve 22 during rotation of the steering wheel within a predetermined normal operating range. Alternatively, the steering wheel can be connected to the steering control member through a lost motion connection so that the steering control member is pivoted only after the steering wheel is rotated beyond a predetermined operating range.

Should an electrical malfunction occur, steering can be achieved by rotating the steering wheel beyond the predetermined operating range. This causes the spring 30 to exert a downward force on the armature 27 of the proportional valve 22 for moving the valving portion 23 downwardly causing leftward movement of the steering valve 17 as described above. Rotating the steering wheel counterclockwise will similarly result in rightward movement of the steering valve 17.

In view of the foregoing description, it is readily apparent that the present invention provides an improved electrohydraulic steering system which utilizes proportional valves as the normal or primary steering control. However, should an electrical malfunction occur, mechanical/hydraulic steering becomes operative simply by rotating the steering wheel beyond its normal operating range. This imparts a mechanical force to the armature of the proportional valve through a spring thereby causing the armature to move the valving portion of the proportional valve to an operating position directing pilot fluid to the steering valve. Making the armatures of the proportional valves responsive to a mechanical input through the springs provides a simple, cost effective mechanical/hydraulic backup for the primary electrohydraulic steering control.

Other aspects, objects and advantages of this invention can be obtained from a study of the drawings, the disclosure and the appended claims.

I claim:

1. An electrohydraulic steering system having a manually operated steering control member movable in opposite directions from a neutral position and a pilot operated steering valve having opposite ends comprising:

a pair of solenoid valves individually hydraulically connected to the opposite ends of the steering valve with each solenoid valve including a valving portion, an electromagnetic coil, and an armature disposed within the coil and connected to the valving portion;

a position sensor disposed to energize one of the coils upon movement of the steering control member in a first direction and to energize the other coil upon movement of the steering control member in a second direction; and means for individually mechanically moving the armatures upon movement of the steering control member in either direction beyond a predetermined operating range thereof so that the solenoid valves can be selectively mechanically actuated to an operating position should an electrical malfunction occur.

2. The electrohydraulic steering system of claim 1 wherein the solenoid valves are proportional valves.

3. The electrohydraulic steering system of claim 2 wherein the moving means includes a spring disposed between the armature and the steering control member.

* * * * *